US008433535B2

(12) United States Patent
Studer

(10) Patent No.: US 8,433,535 B2
(45) Date of Patent: Apr. 30, 2013

(54) HOUSING OR HOUSING PART FOR SANITARY PRODUCT DISPENSER

(75) Inventor: Hans-Jorg Studer, Hittnau (CH)

(73) Assignee: CWS-boco Supply AG, Baar (CH)

( * ) Notice: Subject to any disclaimer, the term of this patent is extended or adjusted under 35 U.S.C. 154(b) by 264 days.

(21) Appl. No.: 12/864,829

(22) PCT Filed: Jan. 14, 2009

(86) PCT No.: PCT/CH2009/000017
§ 371 (c)(1), (2), (4) Date: Oct. 25, 2010

(87) PCT Pub. No.: WO2009/094790
PCT Pub. Date: Aug. 6, 2009

(65) Prior Publication Data

US 2011/0046911 A1 Feb. 24, 2011

(30) Foreign Application Priority Data

Jan. 30, 2008 (CH) .......................................... 137/08

(51) Int. Cl.
*G06F 19/00* (2011.01)

(52) U.S. Cl.
USPC .......................................................... 702/108

(58) Field of Classification Search ................... 702/108
See application file for complete search history.

(56) References Cited

U.S. PATENT DOCUMENTS 6,375,038 B1 4/2002 Daansen et al.
6,707,873 B2 * 3/2004 Thompson et al. ............. 377/13
2007/0119858 A1 5/2007 Ayoub
2008/0019489 A1 1/2008 Lynn

FOREIGN PATENT DOCUMENTS

DE 202005008934 U1 9/2005
DE 102004018033 A1 11/2005
EP 1219202 A1 7/2002

* cited by examiner

*Primary Examiner* — Tung S Lau
(74) *Attorney, Agent, or Firm* — Rankin, Hill & Clark LLP

(57) ABSTRACT

A housing or housing part (2) for a sanitary product dispenser that can be fastened to a wall, comprising: A) a front (3) comprising a monitor (4), wherein B) the housing part (2) can be detachably fastened to a sanitary product dispenser, C) a microprocessor (10) is attached to the housing part (2), D) the housing part (2) comprises a probe (15), which emits electromagnetic or acoustic waves in a direction outside the housing part (2) and/or receives such waves from the outside and based on the emitted and/or received electromagnetic or acoustic waves transmits signals to the microprocessor (10), and wherein E) the microprocessor (10) is programmed in order to determine the presence of a user in the vicinity of the housing part (2) from the signals transmitted by the probe (15) to the microprocessor (10) and as a result switch on the monitor (4).

24 Claims, 1 Drawing Sheet

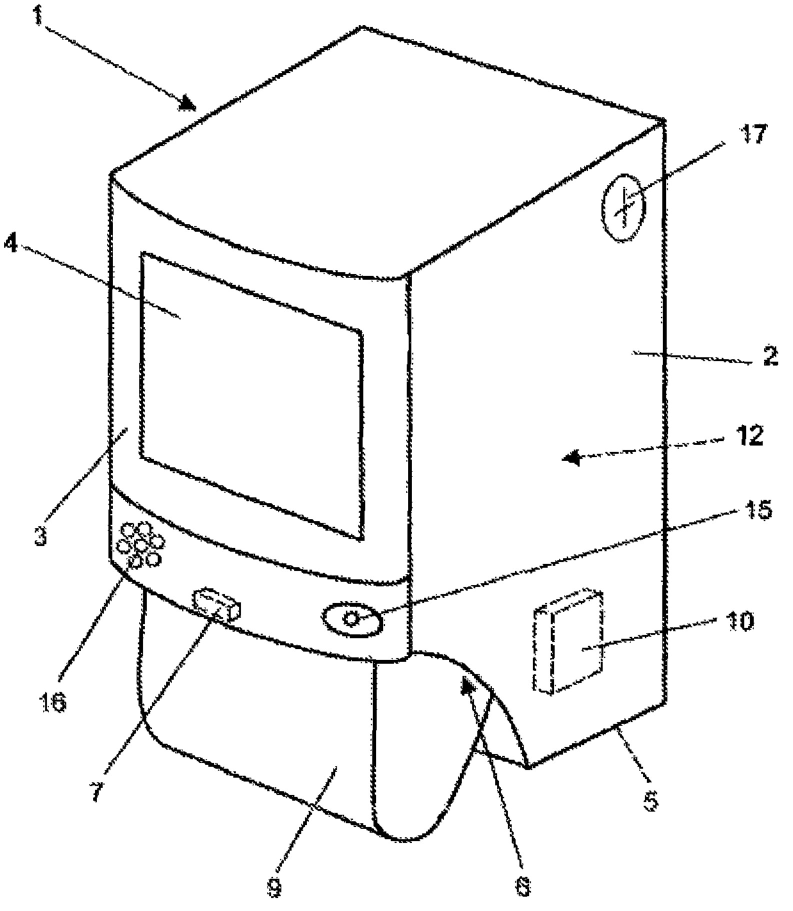
1
17
4
2
12
3
15
10
16
7
5
9
8

HOUSING OR HOUSING PART FOR SANITARY PRODUCT DISPENSER

The invention relates to a housing or housing part for a sanitary product dispenser that can be fastened to a wall according to the preamble of the patent claim 1.

Sanitary product dispensers used in washrooms in the sanitary and hygiene industry comprise substantially fabric towel dispensers, roll paper dispensers, soap lather dispensers, toilet paper dispensers, and fragrance dispensers.

The invention is based on the object to provide a housing or a housing part for a sanitary product dispenser which comprises a monitor that can be automatically switched on and off dependent on the presence of a user.

The invention solves the assigned task with a housing or housing part for a sanitary product dispenser with the features of the claim 1.

The advantages achieved by the invention are essentially that due to the housing part according to the invention for a sanitary product dispenser:

- the monitor is switched on only in the presence of a user;
- on the monitor, advertisement can be displayed by means of stills or video;
- on the monitor, operating instructions for a user can be displayed.

The presence of a user can be detected by means of a probe on the housing, wherein the probe is preferably configured as passive infrared sensor. Other possibilities for the functional configuration of the probe are:

- ultrasound; or
- radar; or
- receiving radio signals from an external switch which is mounted, for example, on the door of the washroom and, upon opening the door, emits radio signals which are received by the probe on the housing part and wherein subsequently the signals necessary for switching the monitor on are transmitted from the probe to the microprocessor.

Preferably, the monitor is switched on if a user is within a distance of less than 4-6 m from the probe. The cone angle of the enveloping cone enveloping the electromagnetic or acoustic waves, within which the reception of the probe is ensured, is preferably 100°-180°, typically 150°.

Further advantageous configurations of the invention can be commented on as follows:

In a preferred embodiment, the housing or housing part is configured as hood and comprises in addition at least one measuring probe arranged inside the hood. The measuring probe arranged inside the hood can preferably allow for determining a quantity of a sanitary product and can be suitable for the following displays on the monitor:

- fill level of a liquid container (e.g. soap solution);
- sanitary product dispenser is fully operational (ok);
- sanitary product in the dispenser is almost used up (e.g. fabric towels will run out shortly); and
- sanitary product in the dispenser is used up.

The measuring probe can be configured as mechanical sensor, infrared or acoustic sensor.

In another embodiment, the at least one measuring probe transmits signals to the microprocessor, and the microprocessor is programmed in such a manner that from the signals transmitted from the measuring probe, a mechanical or electrical malfunction of the sanitary product dispenser arranged within the hollow space of the hood can be detected and instructions for the user or the maintenance personnel for eliminating the malfunction can be displayed. By means of this configuration, the following advantages can be achieved:

- a fabric towel that is not properly guided or is shifted can be brought in the correct position, for example, by means of a light barrier;
- minor malfunctions (e.g. a jammed fabric towel) can be corrected by the user; and
- displaying a motor defect or sensor defect for fast correction by the maintenance personnel, without further trouble shooting.

In a further embodiment, the monitor has a touch-sensitive configuration. Preferably, at least one key or one keypad can be symbolically displayed on the monitor by means of the microprocessor. With this, the following advantages are achievable:

- programming buttons for a sequence control stored in a data storage;
- setting and resetting selected and stored values or preprogrammed functions;
- selector buttons for selecting preprogrammed sequences (functions); and/or
- selection of a cleaning program In yet another embodiment, the housing part comprises a loudspeaker which is switched on simultaneously with the monitor and preferably connected with the microprocessor and/or a radio receiver. With this, the following advantages can be achieved:

- playing music stored in a data storage or on a sound carrier; or
- verbal instructions for the user or the maintenance personnel.

In a further embodiment, the housing part comprises locking means so that the user can not remove it from the sanitary product dispenser or open the latter. The locking means can comprise, for example, a lock.

In another embodiment, the housing part can be snap-mounted transversal to the front on a sanitary product dispenser.

The invention and developments of the invention are described hereinafter in more detail by means of the partially schematic illustrations of a plurality of exemplary embodiments.

In the FIGURE:

FIG. 1 shows a perspective view of an embodiment of the housing part according to the invention for a sanitary product dispenser configured as fabric towel dispenser.

The embodiment illustrated in FIG. 1 shows a housing part 2 for a sanitary product dispenser that can be mounted to a wall, wherein the housing part 2 comprises a front 3 with a monitor 4. The sanitary product dispenser (not drawn) can be configured as commercially available fabric towel dispenser. Further, attached to the housing 2 are a microprocessor 10 and a probe 15 which can emit electromagnetic or acoustic waves in a direction outside the housing part 2 and/or can receive such waves from the outside, and based on the emitted and/or received electromagnetic or acoustic waves, transmits signals to the microprocessor 10. The housing part 2 frames a hollow space 12, in which a sanitary product dispenser can be housed, and has a bottom side 5 formed with an opening 6, through which opening the fabric towel 9 is passed through in the form of a loop.

The microprocessor 10 is programmed in order to determine the presence of a user in the vicinity of the housing part 2 from the signals transmitted by the probe 15 to the microprocessor 10 and subsequently switch on the monitor 4.

The housing part 2 is detachably fastened to the sanitary product dispenser and comprises as locking means a lock 17 so that the user can not remove it from the sanitary product dispenser or open the latter.

A measuring probe 7 arranged on the housing part 2 and configured, for example, as light barrier transmits signals to the correspondingly programmed microprocessor 10 so as to detect from the signals transmitted from the measuring probe 7, a mechanical or electrical malfunction of a drive unit arranged in the hollow space 12 for the fabric towel 9 and to display instructions on the monitor 4 for the user or the maintenance personnel for correcting the operational malfunction.

The monitor 4 is configured in a touch-sensitive manner, wherein on the monitor 4, at least one key or one keypad can be symbolically displayed by means of the microprocessor 10. Moreover, on the housing part 2, a loudspeaker is attached which is switched on together with the monitor 4 and which is suitable, for example, to play music.

The invention claimed is:

1. A housing part for a sanitary product dispenser that can be fastened to a wall, the housing part comprising a front with a monitor and a microprocessor, wherein the housing part can be detachably fastened to the sanitary product dispenser, wherein the housing part comprises a probe which receives waves from outside the housing part, said waves being electromagnetic waves or acoustic waves, and based on the received waves transmits signals to the microprocessor, and wherein the microprocessor is programmed to determine the presence of a user in the vicinity of the housing part from the signals transmitted by the probe to the microprocessor and as a result to switch on the monitor.

2. The housing part according to claim 1, wherein the housing part further comprises at least one measuring probe for detecting a mechanical or electrical malfunction of the sanitary product dispenser connected with the housing part, which measuring probe transmits signals to the microprocessor, and wherein the microprocessor is programmed to detect the mechanical or electrical malfunction of the sanitary product dispenser connected with the housing part from the signals transmitted by the measuring probe and to display information or instructions on the monitor for correcting the malfunction.

3. The housing part according to claim 2, wherein the housing part is configured as a hood and the measuring probe is arranged inside the hood.

4. The housing part according to claim 1, wherein the monitor is configured in a touch-sensitive manner.

5. The housing part according to claim 4, wherein at least one key or one keypad can be symbolically displayed on the monitor by means of the microprocessor.

6. The housing part according to claim 1, wherein the housing part comprises a loudspeaker which is switched on simultaneously with the monitor.

7. The housing part according to claim 1, wherein the housing part comprises locking means so that the user can not remove the housing part from the sanitary product dispenser or open the sanitary product dispenser.

8. The housing part according to claim 1, wherein the housing part can be snap-mounted transversely to the front of the sanitary product dispenser.

9. The housing part according to claim 1, wherein the monitor is switched on by the microprocessor when a user approaches within less than 6 m of the probe.

10. The housing part according to claim 1, wherein the housing part comprises a loudspeaker which is switched on simultaneously with the monitor and is connected with the microprocessor or with a radio receiver.

11. The housing part according to claim 1, wherein the monitor is switched on by the microprocessor when a user approaches within less than 4 m of the probe.

12. The housing part according to claim 1, wherein the probe emits electromagnetic waves or acoustic waves to the outside of the housing part.

13. A housing for a sanitary product dispenser that can be fastened to a wall, the housing comprising a front with a monitor and a microprocessor, wherein the housing can be detachably fastened to the sanitary product dispenser, wherein the housing comprises a probe which receives waves from outside the housing, said waves being electromagnetic waves or acoustic waves, and based on the received waves transmits signals to the microprocessor, and wherein the microprocessor is programmed to determine the presence of a user in the vicinity of the housing from the signals transmitted by the probe to the microprocessor and as a result to switch on the monitor.

14. The housing according to claim 13, wherein the housing further comprises at least one measuring probe for detecting a mechanical or electrical malfunction of the sanitary product dispenser connected with the housing, which measuring probe transmits signals to the microprocessor, and wherein the microprocessor is programmed to detect the mechanical or electrical malfunction of the sanitary product dispenser connected with the housing from the signals transmitted by the measuring probe and to display information or instructions on the monitor for correcting the malfunction.

15. The housing according to claim 14, wherein the housing is configured as a hood and the measuring probe is arranged inside the hood.

16. The housing according to claim 13, wherein the monitor is configured in a touch-sensitive manner.

17. The housing according to claim 16, wherein at least one key or one keypad can be symbolically displayed on the monitor by means of the microprocessor.

18. The housing according to claim 13, wherein the housing comprises a loudspeaker which is switched on simultaneously with the monitor.

19. The housing according to claim 13, wherein the housing comprises locking means so that the user can not remove the housing from the sanitary product dispenser or open the sanitary product dispenser.

20. The housing according to claim 13, wherein the housing can be snap-mounted transversely to the front of the sanitary product dispenser.

21. The housing according to claim 13, wherein the monitor is switched on by the microprocessor when a user approaches within less than 6 m of the probe.

22. The housing according to claim 13, wherein the housing comprises a loudspeaker which is switched on simultaneously with the monitor and is connected with the microprocessor or with a radio receiver.

23. The housing according to claim 13, wherein the monitor is switched on by the microprocessor when a user approaches within less than 4 m of the probe.

24. The housing according to claim 13, wherein the probe emits electromagnetic waves or acoustic waves to the outside of the housing.

* * * * *